(12) United States Patent
Bernstein et al.

(10) Patent No.: US 9,369,339 B2
(45) Date of Patent: Jun. 14, 2016

(54) VIRTUAL CABLE MODEM TERMINATION SYSTEM

(71) Applicant: CISCO TECHNOLOGY, INC., San Jose, CA (US)

(72) Inventors: Alon Bernstein, Monte Sereno, CA (US); John T. Chapman, Laguna Niguel, CA (US); Rundong Huang, Saratoga, CA (US); Sangeeta Ramakrishnan, Saratoga, CA (US); Charles J. Duffy, Nesconset, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 103 days.

(21) Appl. No.: 14/041,859

(22) Filed: Sep. 30, 2013

(65) Prior Publication Data

US 2015/0092531 A1    Apr. 2, 2015

(51) Int. Cl.
*H04L 1/00* (2006.01)
*H04L 12/24* (2006.01)
*H04L 12/803* (2013.01)
*H04N 7/173* (2011.01)

(52) U.S. Cl.
CPC ........ *H04L 41/0672* (2013.01); *H04L 41/0816* (2013.01); *H04L 41/0843* (2013.01); *H04L 47/125* (2013.01)

(58) Field of Classification Search
CPC ... H04L 1/0672; H04L 1/0843; H04L 1/0816; H04L 47/125
See application file for complete search history.

(56) References Cited

U.S. PATENT DOCUMENTS

| | | | |
|---|---|---|---|
| 7,773,594 B2 | 8/2010 | Asati et al. | |
| 7,840,988 B1 * | 11/2010 | Zhou | 725/114 |
| 8,397,267 B2 | 3/2013 | Chapman et al. | |
| 8,457,086 B2 | 6/2013 | Asati et al. | |
| 2007/0140195 A1 * | 6/2007 | Kaftan | H04L 29/1233 370/338 |
| 2011/0173465 A1 * | 7/2011 | Akers | G06F 1/3206 713/310 |
| 2012/0291084 A1 * | 11/2012 | Rakib | 725/111 |
| 2013/0074138 A1 | 3/2013 | Chapman | |
| 2014/0101711 A1 * | 4/2014 | Rakib | 725/129 |
| 2014/0137177 A1 * | 5/2014 | Rakib | 725/129 |
| 2014/0150047 A1 * | 5/2014 | Rakib | 725/129 |
| 2014/0215091 A1 * | 7/2014 | Singh et al. | 709/245 |
| 2014/0269713 A1 * | 9/2014 | Huang et al. | 370/392 |

* cited by examiner

*Primary Examiner* — Clemence Han
(74) *Attorney, Agent, or Firm* — Patent Capital Group

(57) ABSTRACT

A method, a system, and an apparatus provide for a cable modem termination system (CMTS). The CMTS may include a virtual machine configured to provide a plurality of virtual CMTSs (vCMTSs). The CMTS may also include a plurality of subscriber groups. Each subscriber group of the plurality of subscriber groups may be assigned to a vCMTS of the plurality of vCMTSs. Additionally, each vCMTS is configured to provide a process.

20 Claims, 11 Drawing Sheets

VIRTUAL CABLE MODEM TERMINATION SYSTEM

TECHNICAL FIELD

This disclosure relates in general to the field of communications and, more particularly, to managing virtual cable modem termination systems in a network environment.

BACKGROUND

Cable operators have widely deployed high-speed data services on cable television systems. These data services include a cable modem that allows a computer to communicate over an ordinary cable TV network Hybrid Fiber Coax (HFC) cable. A Cable Modem Termination System (CMTS) connects the cable TV network to a data network, such as the Internet. The Data Over Cable Service Interface Specification (DOCSIS) is one of the cable modem standards used for transferring data over the cable TV network. Increasing demand for cable data services requires additional CMTS processing capacity. This can be prohibitively expensive since each CMTS provides routing, DOCSIS Media Access Control (MAC) processing, downstream signal modulation, and upstream signal demodulation. A conventional CMTS architecture does not scale well since any one of the separate components in the CMTS can limit processing capacity and only a limited number of DOCSIS packet processing devices and physical interfaces can be located in the same CMTS chassis.

Different cable networks may also have different processing requirements. For example, one cable network may require substantially more upstream data services than other cable networks. However, it is difficult to customize CMTS architectures for these different data services requirements. It is also expensive to provide redundancy in current CMTS architectures since each backup CMTS includes DOCSIS MAC processors, downstream cable modulators and upstream signal demodulators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one example embodiment, a method is provided that includes identifying a subscriber group for a virtual cable modem termination system (vCMTS); retrieving a generic configuration file; creating a specific configuration file for the subscriber group using the generic configuration file; and configuring the vCMTS for the subscriber group using the specific configuration file. The creating of the specific configuration file can include retrieving information about the subscriber group from a pre-provisioned file; and adjusting the generic configuration file according to the pre-provisioned file to create the specific configuration file. In more particular embodiments, the method can include periodically storing a state of the vCMTS; determining if there is a failure of the vCMTS; and restoring the stored state.

Example Embodiments

Figure 1:
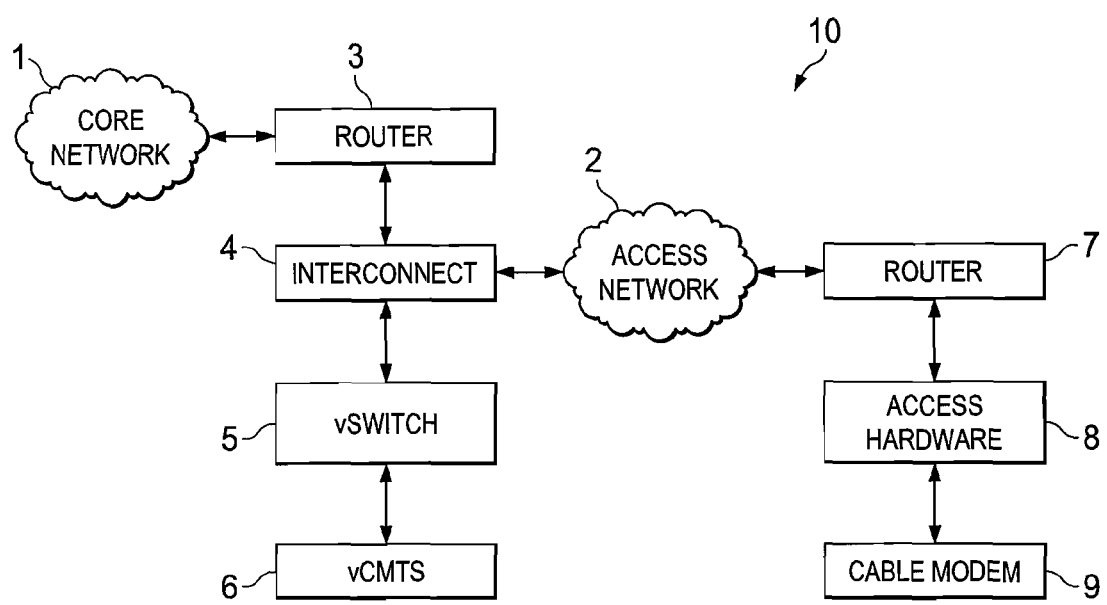
FIG. 1 is a simplified schematic diagram of a communication network in accordance with at least one example embodiment.

FIG. 1 is a simplified schematic diagram of a communication system 10 in accordance with at least one example embodiment. Communication system 10 may be a collection of terminal nodes, links, and any intermediate nodes that are connected to enable telecommunication between the terminals. The transmission links connect the nodes together. The nodes use circuit switching, message switching, or packet switching to pass signals through the correct links and nodes to reach the correct destination terminal. In an embodiment, communication system 10 may include a core network 1, an access network 2, a router 3, an interconnect 4, a virtual switch (vSwitch) 5, a virtual cable modem termination system (vCMTS) 6, a router 7, an access hardware (ACS) 8, and a cable modem 9. Various types of routers and switches may be used to facilitate communications or data and control traffic amongst any of the elements of FIG. 1. Also depicted in FIG. 1 are a number of pathways (e.g., shown as solid lines) between the elements for propagating data and control traffic. Additionally, these pathways may be wired or wireless.

In a specific embodiment, core network 1 may be coupled to the Internet, content providers, and a Public Switched Telephone Network to provide these services to cable modem 9. Core network 1 may be connected to various content providers for providing media content (e.g., movies, television channels, etc.). The content may further distributed by access network 2 to ACS 8 through router 7. ACS 8 may be configured to distribute content to cable modem 9 in the form of digital or Internet Protocol (IP) television.

In this example, ACS 8 may communicate via optical fibers with access network 2 and via coaxial (coax) cable to cable modem 9, and as such, the combination of fiber and coax is known as a hybrid fiber coax (HFC) network (any combination of fiber and coax, may be used anywhere in communication system 10). Communication system 10 may be used to provide high-speed data services including cable Internet, voice over IP (VoIP), and IP television services to various subscribers.

Core network 1 may be coupled to the Internet and the public switched telephone network for providing Internet and telephony services (e.g., to and from cable modem 9). Content providers, via the Internet, may also distribute media content. DOCSIS is used to convey Internet or other packet based networking information, as well as packetized digital media between vCMTS 6 and cable modem 9. Cable modem 9 may be a representation of a single subscriber, multiple subscribers, a subscriber group, a service group, or any other type of desirable grouping.

In a specific embodiment, DOCSIS may be carried between vCMTS 6 and ACS 8 using fiber optic or other medium at the physical layer. The physical (PHY) layer may be referred to herein simply as a downstream PHY or PHY layer. ACS 8 may be configured to convert the downstream optical PHY to downstream coaxial PHY for transmission to cable modem 9. Similarly, ACS 8 converts the upstream coaxial PHY to upstream optical PHY for transmission to vCMTS 6. ACS 8 may also provide Media Access Control (MAC) protocol layer services.

Traditional M-CMTS architectures may employ a downstream PHY (e.g., a fiber node) that houses one or more edge quadrature amplitude modulation (EQAM) modules to provide radio frequency (RF) modulation for a downstream transmission. It should be understood that various electrical-to-optical (E/O) and optical-to-electrical (OLE) conversions might take place along the downstream and upstream DOCSIS pathways, with a coaxial PHY ultimately presented at the customer premise, e.g., at cable modem 9. The downstream nodes can employ an Internet Protocol (IP) tunnel that encapsulates DOCSIS according to a Downstream External-PHY Interface (DEPI) specification. While DEPI provides some control plane information, this information may be limited to the DOCSIS realm. As such, hardware, firmware, and/or software components of ACS 8 may be configured manually (e.g., based on whether the EQAM will use QAM-64 or QAM-256 modulation). Some downstream parameters may be configured using DEPI.

In an embodiment, the generic control protocol (GCP), DEPI, and upstream External-PHY Interface (UEPI) tunnels may be referred to as pseudowires. A pseudowire is a network connection that encapsulates a point-to-point protocol using a packet network protocol, where the encapsulation is transparent to the point-to-point endpoints. Many pseudowires carry time sensitive data or protocols that require synchronization and, therefore, use a timing source. The pseudowires may be facilitated, for example, by Multi-Protocol Label Switching (MPLS) or Layer 2 Tunneling Protocol version 3 (L2TPv3). Note that technically, GCP is not a pseudowire, per se, since it carries control plane information, but for ease of description, GCP may be conceptually thought of as a pseudowire. Any vCMTS 6 and ACS 8 may include hardware and software provisioned to implement the techniques described herein.

In a specific embodiment, ACS 8 may be aggregating/de-aggregating the traffic into Layer 2 tunnels, such as Layer 2 Tunneling Protocol Version 3 tunnels, (DEPI or UEPI), however it may apply to other vCMTS architectures as well. Interconnect 4 and vSwitch 5 may be part of data center systems and may be used to access specific servers/virtual machines within the data center as well as create network overlays within a data center. In an embodiment, the connectivity may be fairly static, but under some conditions, vCMTS 6 may be moved based on particular needs, scenarios, etc. Depending on the load balancing architecture, this may or not affect how the connectivity relative to ACS 8 and service chain elements is managed on the forwarding plane.

In an embodiment, vCMTS 6 may be part of a service chain, where the service chain can include standalone modules that apply specific features to traffic flows, for example, Deep packet inspection (DPI), Network Access Traversal (NAT), and parental control. Since the main network service that vCMTS 6 provides is managed connectivity to subscribers (i.e., QoS and IP connectivity), at the end of a service chain the traffic is prepared for delivery. A software defined network (SDN) may coordinate the forwarding path across the various network elements depicted in FIG. 1. Additionally, in different embodiments, 3GPP packet-core elements may be applied to different aspects of the service chain. A network architecture based on the concept of a "cable packet core" may be moved to a cloud environment.

Figure 2:
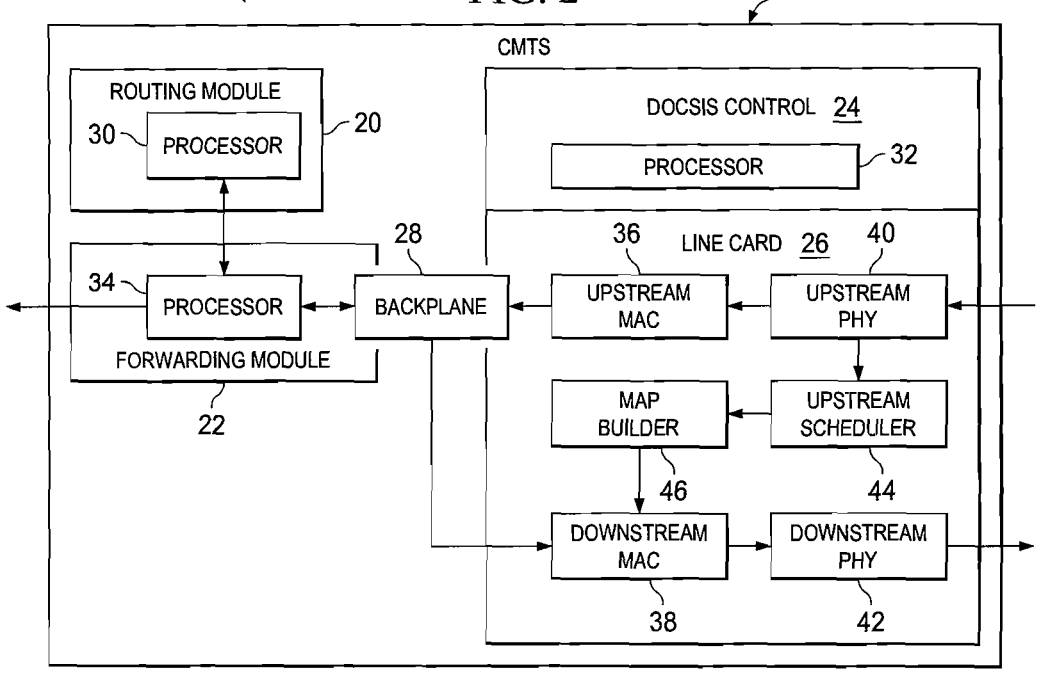
FIG. 2 shows a block diagram of a Cable Modem Termination System (CMTS) environment in accordance with at least one example embodiment.

FIG. 2 shows a block diagram of a Cable Modem Termination System (CMTS) environment 11 in accordance with at least one example embodiment. CMTS environment 11 may include CMTS 12. As shown in FIG. 2, CMTS 12 may be configured or designed to include a plurality of functionally different modules or components, including, for example, a routing module 20, a forwarding module 22, a Data Over Cable Service Interface Specification (DOCSIS) control 24, and a line card 26. In an example, routing module 20 and DOCSIS control 24 may be part of a control plane, while forwarding module 22 and line card 26 may be part of a data plane.

In an embodiment, routing module 20 may be configured to implement routing or forwarding operations and forwarding module 22 may be configured to provide packet-forwarding operations. Additionally, in some embodiments, CMTS 12 may also include a utility component adapted to provide a system clock and a timestamp functionality. Routing module 20 may be configured to provide layer one, layer two, layer three, and layer four functionality, as well as quality of service (QoS) functionality.

According to an embodiment, routing module 20 may be configured as a processor-based routing system comprising functionality incorporated within a typical router. For example, as shown in the embodiment of FIG. 2, routing module 20 comprises a processor 30 (e.g., a microprocessor without Interlocked Pipeline Stages). A network routing operating system, portions of which may reside in memory and executed by routing module 20, may functionally organize CMTS 12 by invoking network operations in support of software processes executing on CMTS 12.

In an embodiment, routing module 20 may be configured to construct and load routing tables used by forwarding module 22. Routing module 20 may also be configured or designed to perform configuration management functions, and to communicate with neighboring peer, standby, and/or backup routers to exchange protocol data units used to construct the routing tables in accordance with routing algorithms. Additionally, other memory types, including various computer readable media, may be used for storing and executing program instructions pertaining to the operation of routing module 20.

According to various embodiments, forwarding module 22 may comprise a processor and memory for handling transport layer and network layer functionality. Forwarding module 22 may also be configured to provide transaction compacting functionality, data parcel tunneling functionality, data transmission functionality, etc. According to a specific embodiment, line card 26 may be configured or designed to implement selected aspects of the DOCSIS functionality, such as, for example, a DOCSIS MAC functionality. In an embodiment, DOCSIS control 24 may be configured to send timing and frequency requirements to line card 26. DOCSIS control 24 may also include a processor 32.

In the specific embodiment as shown in FIG. 2, line card 26 may provide functions on several network layers, including a physical layer and a MAC layer. The physical layer may be responsible for receiving and transmitting radio frequency (RF) signals. Hardware portions of the physical layer may include at least one upstream PHY, such as upstream PHY 40 and/or at least one downstream PHY, such as downstream PHY 42. The physical layer may also include software for driving the hardware components of the physical layer.

In an embodiment, upstream optical data signals (traffic) arriving via an optical fiber node are converted to electrical signals and then demodulated by upstream PHY 40. The demodulated information is then passed to the MAC layer. In an embodiment, the MAC layer includes both a MAC hardware portion and a MAC software portion for upstream MAC 36 and downstream MAC 38. The MAC layer software portion may include software relating to DOCSIS MAC functionality. The MAC layer hardware and software portions can operate together to provide the DOCSIS MAC functionality.

In an embodiment, the MAC layer (MAC 36 and 38) may encapsulate, with MAC headers, downstream packets at downstream MAC 38 and decapsulate, the MAC headers, upstream packets at upstream MAC 36. The encapsulation and decapsulation processes may proceed for transmission of data or other information. The MAC headers may include addresses to specific modems (if sent downstream), or to the CMTS (if sent upstream). In different embodiments, cable modems may also include MAC addressing components. In the cable modems, these components may encapsulate upstream data with a header containing the MAC address of the CMTS.

Upstream MAC 36 may be configured to pass the traffic to backplane 28. Backplane 28 may include the appropriate hardware and/or software for converting data formats received at the line cards to a suitable protocol format for transmission from the line card to forwarding module 22. In this embodiment, backplane 28 may be coupled to the respective interface circuitry of line card 26 and forwarding module 22. In an embodiment, backplane 28 may be configured to pass traffic to downstream MAC 38 from forwarding module 22.

Downstream MAC 38 transmits information to downstream PHY 42. Downstream PHY 42 takes the traffic (or other information) in a packet structure and converts it to modulated downstream frames on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from intermediate frequency (IF) electrical signals to radio frequency (RF) electrical signals (or vice-versa) using one or more electrical signal converters (not shown).

Additionally, line card 26 may include an upstream scheduler 44 that arbitrates bandwidth requirements among multiple cable modems. A map builder 46 may also be included within line card 26 to transmit a bandwidth allocation map containing upstream slot specifications and grant specifications to cable modems.

In different embodiments, line card 26 may also include a central hardware block including one or more processors and memory. These hardware components interact with software and other hardware portions of the various layers within the line card. They provide general purpose computing power for much of the software. The memory may include, for example, I/O memory (e.g., buffers), program memory, shared memory, etc. One or more data structures used for implementing the technique of the present disclosure may reside in such memory. In one embodiment, the software entities are implemented as part of a network operating system running on hardware. Preferably, at least parts of the functionality of the various embodiments embodiment are implemented in software as part of the operating system. In FIG. 2, such software may be part of MAC layer software, or may be closely associated therewith. Of course, the logic necessary to implement the methods of this embodiment could reside in hardware, software, or some combination of the two.

Additionally, according to specific embodiments, at least a portion of functions described herein that are performed by CMTS 12, line card 26, and/or selected components thereof, may be implemented in a virtual CMTS (vCMTS) system. Further, the various embodiments may be implemented in any computer network having a standardized protocol for utilizing a central termination system to schedule timeslots for remote stations or nodes on a return (or upstream) channel.

Figure 3:
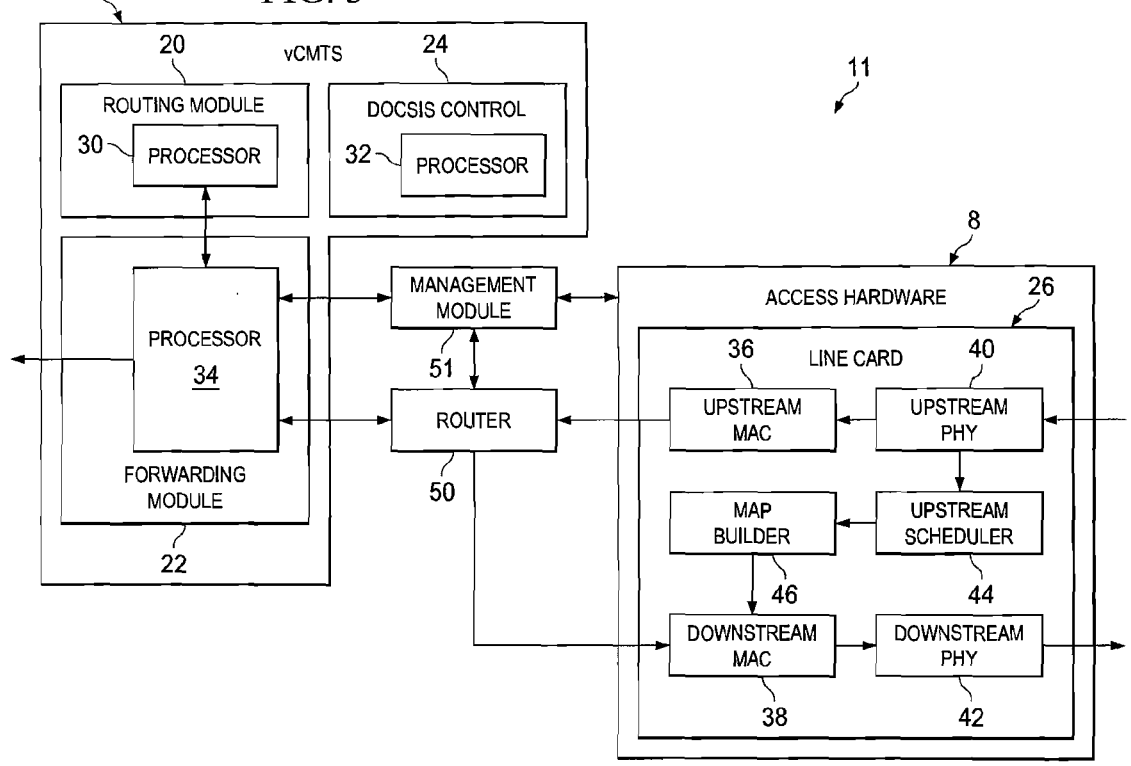
FIG. 3 shows a block diagram of CMTS environment with a remote PHY and MAC in accordance with at least one example embodiment.

FIG. 3 shows a block diagram of CMTS environment 11 with a remote PHY and MAC in accordance with at least one example embodiment. As shown in FIG. 3, the architecture may include vCMTS 6 and access hardware 8. The term "remote PHY" can mean either a physical layer that is deep within the hybrid fiber coaxial (HFC), such as in a fiber node, or a physical layer that is separated from the rest of the system, but that is still in a CMTS hub.

In an embodiment, vCMTS 6 may include routing module 20, forwarding module 22, and DOCSIS control 24. Access hardware 8 may include line card 26. Line card 26 may include upstream MAC 36, downstream MAC 38, upstream PHY 40, downstream PHY 42, upstream scheduler 44, and MAP builder 46. Additionally, access hardware 8 and vCMTS 6 may be connected through a router 50. Router 50 may be a router with capabilities to connect to a cloud infrastructure.

In an embodiment, vCMTS 6 may be a cloud infrastructure with industry standard high volume servers, switches, and storage, which may be located in datacenters, network nodes, and/or in the end user premises. vCMTS 6 may involve the implementation of network functions in software that can run on a range of industry standard server hardware, and that can be moved to, or instantiated in, various locations in the network as required, without the need for installation of new equipment.

In a specific example, router 50 may communicate with vCMTS 6 through a management module 51. Management module 51 may be configured to manage multiple vCMTSs. For example, management module 51 may manage a vCMTS for each subscriber group, for each subscriber, or any other desirable grouping. In different embodiments, management module 51 may be provisioned differently. For example, management modules may be implemented in a cloud environment, within access hardware 8, vCMTS 6, virtual machine, across multiple servers using shared processing, and implemented in other locations.

In a specific embodiment, the architecture in this embodiment may be implemented using a modular head-end architecture (MHA) protocol suite (e.g., MHA version 2) as the interface between routing module 20/forwarding module 22 and line card 26. However, in an example, for non-hybrid fiber coaxial network access, such as a passive optical network (PON), a generic IP without any tunneling may be used.

This embodiment may have some functions, for example, a router and/or services, implemented on a generic router. In one or more embodiments, the entire control plane may be implemented in vCMTS 8 (the cloud). In one example embodiment, CMTS environment 11 extracts Ethernet frames at the remote PHY. Therefore, it may be possible to implement services at the remote PHY itself.

In one or more embodiments, this architecture implements a full MAC function, including decryption. Therefore, the packets that are sent to/from access hardware 8 are not automatically encrypted. If a secure link is desired between access hardware 8, router 50, and vCMTS 6 (with MHAv2) then it may be encrypted.

Figure 4:
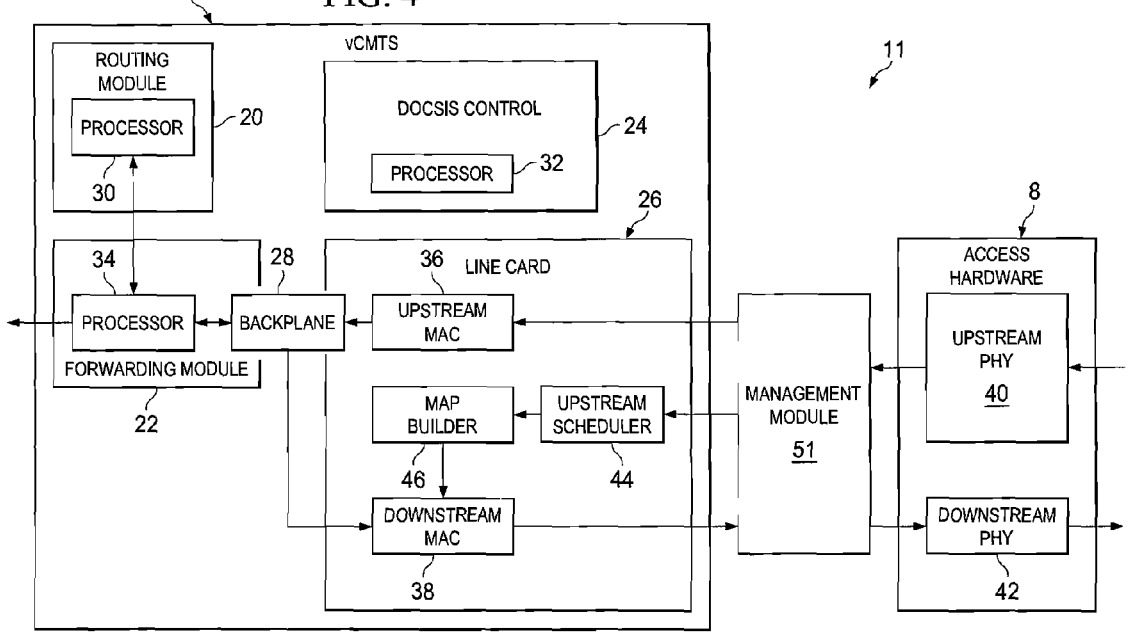
FIG. 4 shows a block diagram of CMTS environment with a remote PHY in accordance with at least one example embodiment.

FIG. 4 shows a block diagram of CMTS environment 11 with a remote PHY in accordance with at least one example embodiment. As shown in FIG. 3, the architecture may include vCMTS 6 and access hardware 8. In an embodiment, vCMTS 6 may include routing module 20, forwarding module 22, DOCSIS control 24, and line card 26. In this embodiment, line card 26 includes upstream MAC 36, downstream MAC 38, upstream scheduler 44, and MAP builder 46. Access hardware 8 may include upstream PHY 40 and downstream PHY 42. Additionally, access hardware 8 and vCMTS 6 may be connected through management module 51. In different embodiments, management module 51 may be provisioned differently. For example, management module 51 may be implemented in a cloud environment, within access hardware 8, vCMTS 6, virtual machine, across multiple servers using shared processing, and implemented in other locations.

In an embodiment, vCMTS 6 may be a cloud infrastructure with industry standard high volume servers, switches, and storage, which may be located in datacenters, network nodes, and in the end user premises. vCMTS may involve the implementation of network functions in software that can run on a range of industry standard server hardware, and that can be moved to, or instantiated in, various locations in the network as required, without the need for installation of new equipment.

Access hardware 8 may communicate with vCMTS 6 through a management module 51. Management module 51 may be configured to manage multiple vCMTSs. For example, management module 51 may manage a vCMTS for each subscriber group, for each subscriber, or any other desirable grouping. In different embodiments, management module 51 may implement different processes herein with a router, such as router 50. In a specific embodiment, CMTS environment may be implemented by having upstream MAC 36, downstream MAC 38, including the upstream scheduler and map builder 46, in the cloud or a router. Since MHAv2 has the flexibility to move MAC functions between the remote and hub locations, the interface for this embodiment may also fall within the framework of the MHAv2 set of protocols. Information and data may be encrypted or scrambled between vCMTS 6 and access hardware 8.

Figure 5:
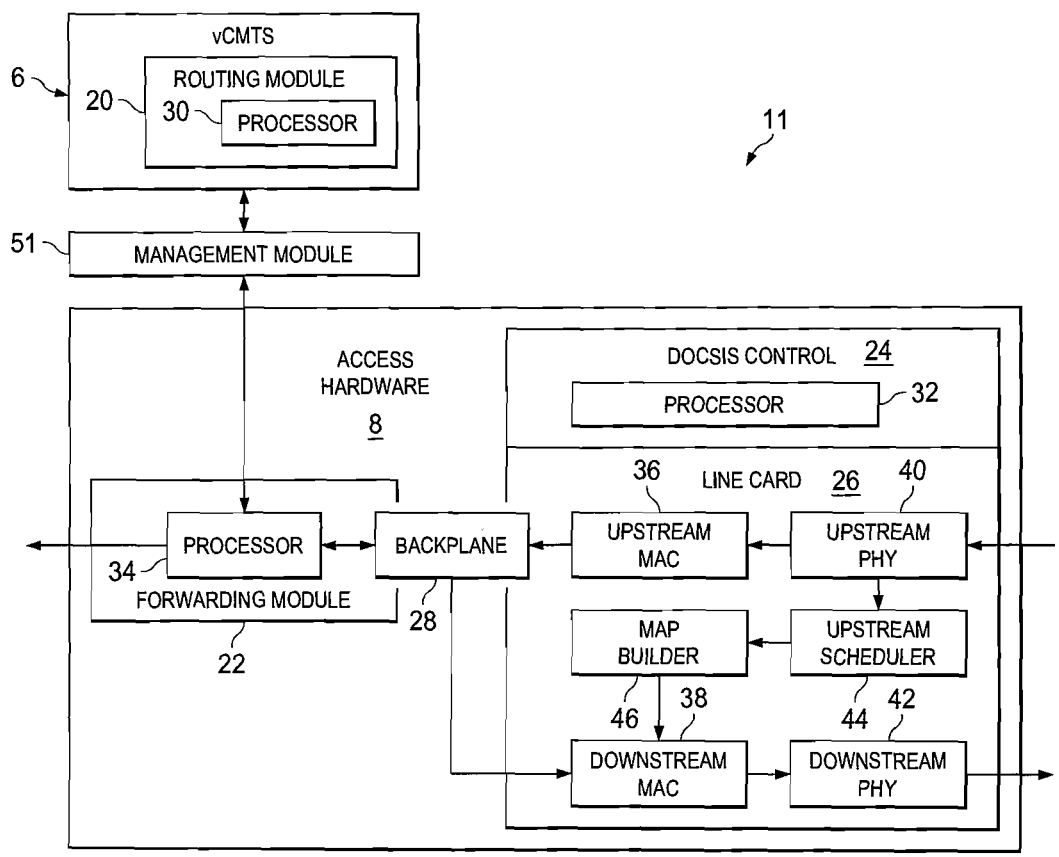
FIG. 5 is a simplified flowchart illustrating a method for managing target instances of a user-defined target type in accordance with one example embodiment.

FIG. 5 shows a block diagram of CMTS environment 11 with a remote control plane in accordance with at least one example embodiment. As shown in FIG. 5, CMTS environment 11 may include vCMTS 6 and access hardware 8. In this embodiment, vCMTS 6 may include routing module 20. Access hardware 8 may include line card 26, forwarding module 22, and DOCSIS control 24. Line card 26 may include upstream MAC 36, downstream MAC 38, upstream PHY 40, downstream PHY 42, upstream scheduler 44, and MAP builder 46. Additionally, access hardware 8 and vCMTS 6 may be connected through management module 51.

Management module 51 may be configured to manage multiple vCMTSs. For example, management module 51 may manage a vCMTS for each subscriber group, for each subscriber, or any other desirable grouping. In different embodiments, management module 51 may be provisioned differently. For example, management module 51 may be implemented in a cloud environment, within access hardware 8, vCMTS 6, virtual machine, across multiple servers using shared processing, and implemented in other locations. In different embodiments, management module 51 may implement different processes herein with a router, such as router 50.

In an embodiment, vCMTS 6 may be a cloud infrastructure with industry standard high volume servers, switches, and storage, which may be located in datacenters, network nodes, and in the end user premises. vCMTS may involve the implementation of network functions in software that can run on a range of industry standard server hardware, and that can be moved to, or instantiated in, various locations in the network as required, without the need for installation of new equipment.

Access hardware 8 may communicate with vCMTS 6 through a management module 51. Management module 51 may be configured to manage multiple vCMTSs. For example, management module 51 may manage a vCMTS for each subscriber group, for each subscriber, or any other desirable grouping. In a specific embodiment, the control plane (routing module 20) is separated from the data plane (forwarding module 22 and line card 26). In this embodiment, only the control plane may be exported to cloud (a general computing resource or virtual machine). One or more embodiments of this disclosure provide a set of protocols to remotely configure and manage the remote device (access hardware 8). In an example, routing specific policies can be implemented with, but not limited to, either OnePK or OpenFlow protocols.

In an embodiment, the DOCSIS control 24 may remain with access hardware 8. However, in other embodiments, DOCSIS control 24 may be removed to vCMTS 6 as well. In this embodiment, the data plane may split across access hardware 8. A router services network functions using different techniques, and CMTS environment 11 can conform to the "service chain" concept. In different examples, some of the services can also be implemented in vCMTS 6. Different main cable specific data plane functions may be implemented in the network. DOCSIS management over PON may be an example of a technology that may be utilize CMTS environment 11.

Note that FIGS. 2-5 are examples of CMTS environments according to various example embodiments. The examples of FIGS. 2-5 are merely example and do not limit the claims in any way. One or more embodiments provide for a server complex that serves more than one CMTS. For example, the server complex may support a large city or region with twenty CMTSs. The server complex may have geographical redundancy.

In an embodiment, remote PHY modules may be processed by network software rather than a local CMTS. The network software may be local remote, or hosted. The centralized software may operate with many system hardware configurations using generic application programming interfaces (API). The cloud communication may be a software defined network or another type of API. Different embodiments may provide a system where a radio frequency is provided at the edge of a network where it can connect to a coaxial cable, packet forwarding, and quality of service is done by a network element, and/or there may be different splits of software between the CMTS and the cloud.

In certain example embodiments, there may be an event threshold that may determine if an event is hosted on the server or locally. If that event threshold was, for example, one second, then transactions faster than one second may be implemented locally, while transactions that can tolerate more than one second may be implemented remotely. The latency of operation may be dominated by server reaction time rather than transmission time. If this is the case, then geographical proximity may not be necessary.

Figure 6:
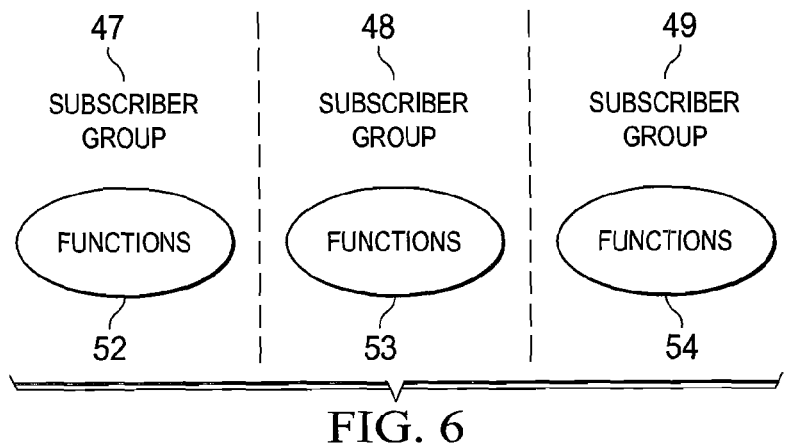
FIG. 6 shows a block diagram of vertical slicing in accordance with at least one example embodiment.

FIG. 6 shows a block diagram of vertical slicing in accordance with at least one example embodiment. As shown in FIG. 6, subscriber groups are split into slices. Each slice may be its own process performed by vCMTS 6. Each process performs a number of functions indicated by functions 52-54. The various embodiments recognize and take into account that in current routers, the various software modules and processes are separated by function. Examples of such functions are, for example, a subscriber management process, a DOCSIS MAC messaging process, a routing process, and a policy process. In these systems, each function is implemented in a separate process, but each process handles all subscribers. In embodiments of this disclosure, all functions may be collapsed to a single process, with each subscriber having a dedicated process. In vCMTS 6, the vertical splicing can be along subscriber lines or service group (SG) lines. In an example, a subscriber group may be configured along the lines of a service group, along fiber nodes, every subscriber separately, based on billing, or any other desirable configuration.

Figure 7:
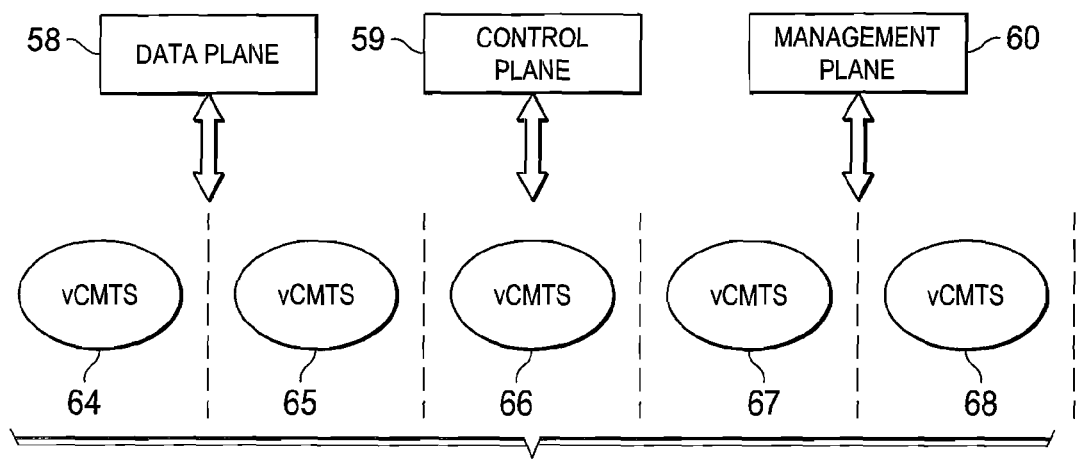
FIG. 7 shows a block diagram of multiple vCMTSs in accordance with at least one example embodiment.

FIG. 7 shows a block diagram of multiple vCMTSs in accordance with at least one example embodiment. As shown in FIG. 7, a network or cloud may send data from a data plane 58, a control plane 59, and a management plane 60 to a plurality of vCMTSs, such as, vCMTS 64-68. Each vCMTS may communicate with the different planes 58-60. In an embodiment, data plane 58 may enable data transfer (traffic) to and from clients, handling multiple conversations through multiple protocols, and manages conversations with remote peers. Data plane traffic travels through routers, rather than to or from them. Control pane 59 may be the part of a network that carries signaling traffic and is responsible for routing. Control packets originate from or are destined for a router. Functions of the control plane may include system configuration and management. Management plane 60 may carry the operations and administration traffic required for network management.

In an embodiment, the vertical splitting may perform orchestration of the vertical slices as depicted in FIG. 7. Throughout this description, a vCMTS is associated with a subscriber group (defined as a ground of subscribers sharing a set of fiber nodes). However, the different embodiments are not limited to slices of subscriber groups and the same concepts can be applied to other types of slices.

Figure 8:
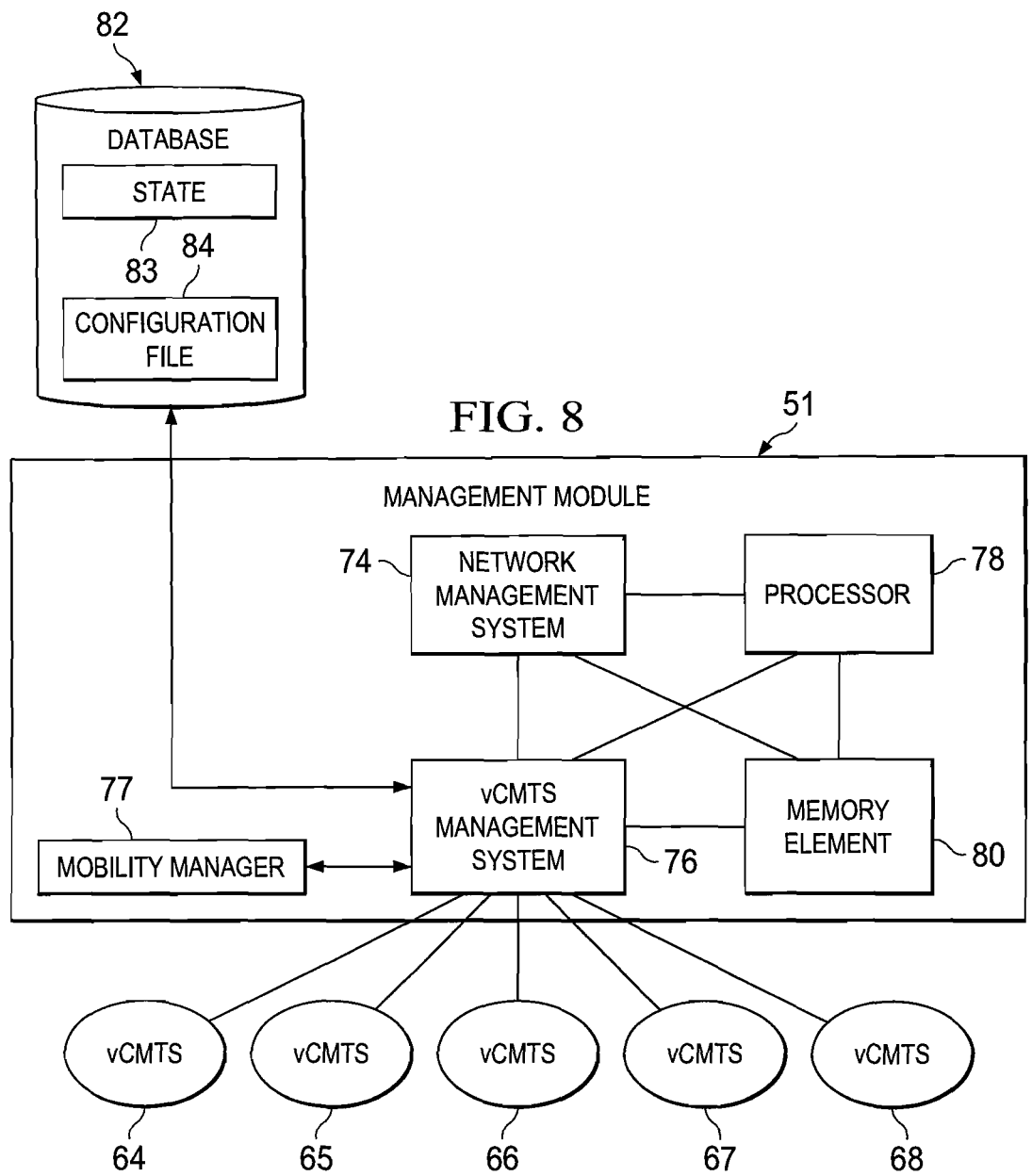
FIG. 8 shows a block diagram of a management module in accordance with at least one example embodiment.

FIG. 8 shows a block diagram of a management module in accordance with at least one example embodiment. As shown in FIG. 8, management module 51 may include a network management system 74, a vCMTS management system 76, mobility manager 77, and database 82. In some instances vCMTS management system 76 may manage vCMTS 64-68.

In an embodiment, network management system 74 may be configured to monitor and administer network elements and devices in a computer network. Device management may include faults, configuration, accounting, performance, and security management. Management tasks may include discovering network inventory, monitoring device health and status, providing alerts to conditions that impact system performance, and identification of problems, their source and possible solutions.

In an example embodiment, vCMTS management system 76 may orchestrate a large number of vCMTSs in order to simplify and harmonize the vCMTS system solution to appear as a single manageable entity to network management system 74. vCMTS management system 76 may include the CMTS configuration elements. vCMTS management system 76 may access database 82 for a state 83 or a configuration file 84. In some embodiments, vCMTS management system 76 may be an entity in a data center (or cloud). State 83 may be a "snapshot" or recording of critical system files, program files, and/or registry settings. State 83 may also In an embodiment, configuration file 84 may include initial settings for critical system files, program files, and/or registry settings. Configuration file 84 may be a generic subscriber group configuration file used as a template to create specific configuration files. In an example, vCMTS management system 76 may access a pre-provisioned file to create a specific configuration file based on configuration file 84. The pre-provisioned file may be created dynamically by retrieving subscriber information or may be created manually by an administrator. In a specific embodiment, mobility manager 77 may be configured to move vCMTS 64-68 within the data center or outside the data center because of load balancing, fault recovery, or other reasons.

Additionally, in an embodiment, management module 51 may include a processor 78 and a memory element 80. In different example implementations, the activities outlined herein may be implemented by logic encoded in one or more tangible media, which may include non-transitory media. For example, the activities outlined herein may be implemented by embedded logic provided in an application specific integrated circuit (ASIC), digital signal processor (DSP) instructions, software (potentially inclusive of object code and source code), firmware, and/or hardware to be executed by a processor 78, or other similar machine, etc. In some of these instances, memory element 80 can store data used for the operations described herein. This includes memory element 80 being able to store software, logic, code, or processor instructions that are executed to carry out the activities described in this Specification.

Processor 78 can execute any type of instructions associated with the data to achieve the operations detailed herein in this Specification. In one example, a processor could transform an element or an article (e.g., data) from one state or thing to another state or thing. In another example, the activities outlined herein may be implemented with fixed logic or programmable logic (e.g., software/computer instructions executed by processor 78) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof. Any of the potential processing elements, modules, and machines described in this Specification should be construed as being encompassed within the broad term 'processor.'

The computer elements in management module 51 may further keep information, to be used in achieving the tunneling activities as discussed herein, in any suitable memory element, such as memory element 80 (e.g., random access memory (RAM), read only memory (ROM), EPROM, EEPROM, ASIC, a disk drive, a floppy disk, a compact disk ROM (CD-ROM), a digital versatile disk (DVD), flash memory, a magneto-optical disk, other types of nonvolatile machine-readable media that are capable of storing data and information, etc.), software, hardware, firmware, or in any other suitable component, device, element, or object where appropriate and based on particular needs. Moreover, the information being used, tracked, sent, or received in management module 51 could be provided in any database, register, queue, table, cache, or other storage structure, all of which can be provided in any suitable timeframe. Any of the memory items or storage options may be included within the broad term 'memory element' as used herein.

Figure 9:
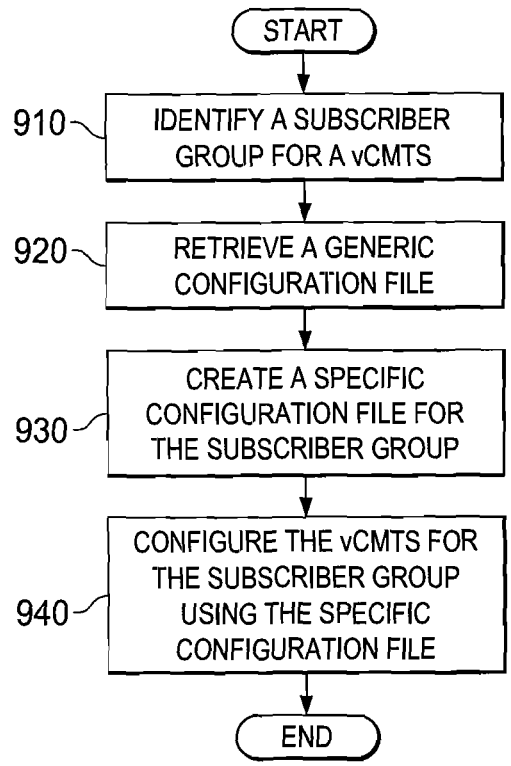
FIG. 9 is a flow diagram illustrating activities associated with configuring a vCMTS in accordance with at least one embodiment.

FIG. 9 is a flow diagram illustrating activities associated with configuring a vCMTS in accordance with at least one embodiment. In at least one example embodiment, there is a set of operations that corresponds the activities of FIG. 9. An apparatus, for example management module 51, or a portion thereof, may utilize the set of operations.

The apparatus may comprise means, including, for example processor 78 of FIG. 8, for performing such operations. In an example embodiment, an apparatus, for example management module 51, is transformed by having memory, for example memory element 80 of FIG. 8, comprising computer code configured to, working with a processor, for example processor 78 of FIG. 8, cause the apparatus to perform set of operations of FIG. 6.

In an embodiment, since vertical slices may be similar, the same base configuration can be applied to all of them. Standard tools for configuration management (such as netconf) may be used to coordinate the configuration across the vCMTSs in order to reduce the operational overhead of managing a large number of vCMTS. At block 910, a subscriber group for a vCMTS is identified. At 920, the apparatus retrieves a generic service group configuration. The generic service group configuration may be a configuration file for a generic vCMTS, such as vCMTS 6. At block 930, the apparatus creates a specific configuration file for a specific service group. A vCMTS configuration file may be a list of parameters and their values. For example, some parameters and values may be, but not limited to, CMTS name="cmts1", fiber node name="FN2", number of upstreams=3, upstream 1 modulation=64 QAM.

At block 940, the apparatus configures a vCMTS for the specific service group using the specific configuration file. As used herein, a configuration file may be a part of an image file. An image file may include an executable. As used herein, wherever a flow diagram manages a configuration file, the flow diagram may also manage an image file in a similar manner.

Figure 10:
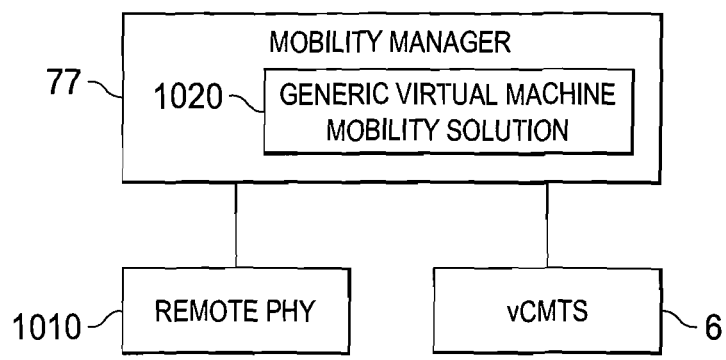
FIG. 10 shows a block diagram of a mobility manager with a mobility solution in accordance with at least one example embodiment.

FIG. 10 shows a block diagram of a mobility manager with a mobility solution in accordance with at least one example embodiment. As shown in FIG. 10, a remote PHY 1010 may communicate with mobility manager 77. Remote PHY 1010 may be an example of ACS 8 as shown in FIG. 3. Mobility manager 77 may be configured to move vCMTS 6 within the data center or outside the data center because of load balancing, fault recovery, or other reasons. Mobility manager 77 may use a generic virtual machine mobility solution 1020 to manage vCMTS 6 as well as other vCMTSs.

Figure 11:
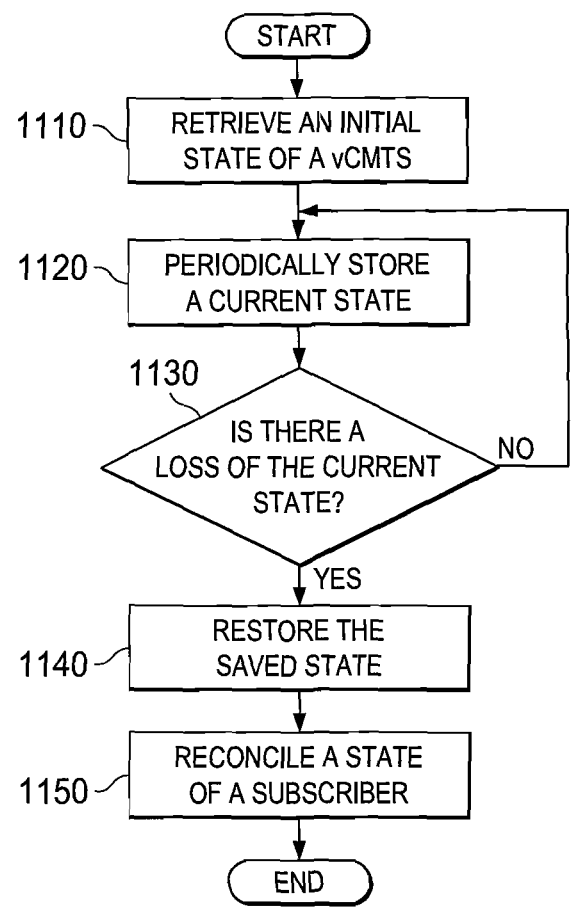
FIG. 11 is a flow diagram illustrating activities associated with managing a vCMTS recovery in accordance with at least one embodiment.

FIG. 11 is a flow diagram illustrating activities associated with managing a vCMTS recovery in accordance with at least one embodiment. In at least one example embodiment, there is a set of operations that corresponds the activities of FIG. 9. An apparatus, for example management module 51, or a portion thereof, may utilize the set of operations. The apparatus may comprise means, including, for example processor 78 of FIG. 8, for performing such operations. In an example embodiment, an apparatus, for example management module 51, is transformed by having memory, for example memory element 80 of FIG. 8, comprising computer code configured to, working with a processor, for example processor 78 of FIG. 8, cause the apparatus to perform set of operations of FIG. 6. This embodiment may be improve recovery from failure and can be an alternative to existing CMTS high-availability features such as N+1 redundancy.

At block 1110, the apparatus retrieves an initial state of a vCMTS. The configuration files need to be managed and distributed to the vCMTSs. A state may be a "snapshot" or recording of critical system files, program files, and/or registry settings. At block 1120, the apparatus may periodically store a current state. The state may be saved (stored) in a database. The state can be periodically saved per vCMTS. For example, once a day, per hour, or any other desirable setting based on time or an event. At block 1130, the apparatus determines whether there is a loss of the current state. If there is a loss, the apparatus at block 1140, may restore the saved state. If the vCMTS crashes, the stored state can be quickly reloaded. Otherwise, if there is not a loss, the apparatus repeats block 1120.

At block 1150, the apparatus may reconcile a state of a subscriber. The changes from the older state to the new one may be "reconciled" quickly in a cable specific way. For example, if a new subscriber joined just between the time a vCMTS configuration file was saved and a crashed, it will not be restored. However, the subscriber may still be quickly brought back online. Still, the majority of subscribers may be immediately brought back online.

Figure 12:
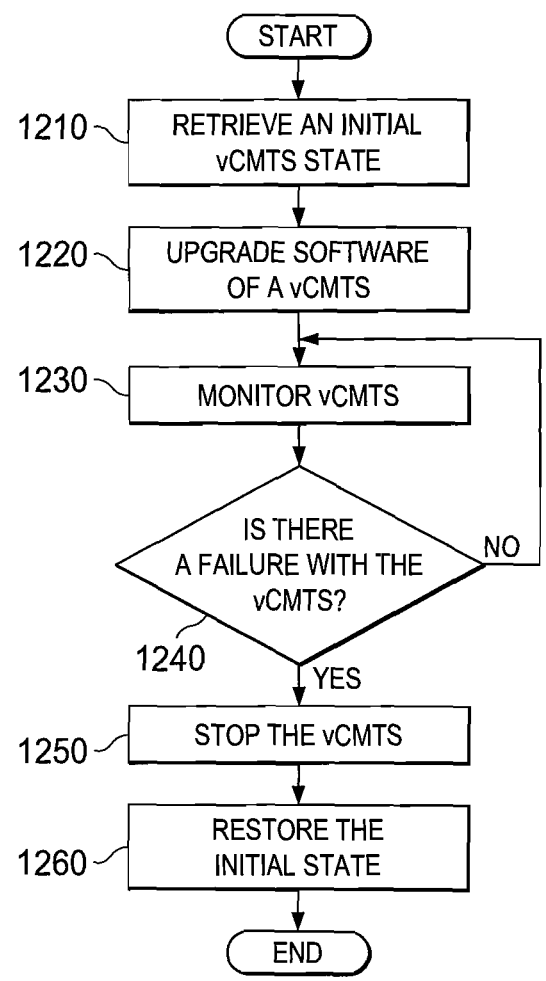
FIG. 12 is a flow diagram illustrating activities associated with managing a vCMTS upgrade in accordance with at least one embodiment.

FIG. 12 is a flow diagram illustrating activities associated with managing a vCMTS upgrade in accordance with at least one embodiment. In at least one example embodiment, there is a set of operations that corresponds the activities of FIG. 9. An apparatus, for example management module 51, or a portion thereof, may utilize the set of operations. The apparatus may comprise means, including, for example processor 78 of FIG. 8, for performing such operations. In an example embodiment, an apparatus, for example management module 51, is transformed by having memory, for example memory element 80 of FIG. 8, comprising computer code configured to, working with a processor, for example processor 78 of FIG. 8, cause the apparatus to perform set of operations of FIG. 6.

In different embodiments, vCMTS may run different software (SW) versions. This fine-grained SW distribution will allow a multiple system operator to implement SW one service group at a time. In turn, this may significantly reduce the test and qualification times for new SW releases by enabling in-production testing of SW. For example, if a service group is less than 500 subscribers, even if there are bugs in the SW version, they are less impactful on the system. At block 1210, the apparatus retrieves an initial state of the vCMTS. At block 1220, the apparatus may upgrade software of a vCMTS. The software may be upgraded and the configuration file may be amended to reflect the current configurations.

At block 1230, the apparatus may monitor the vCMTS. The vCMTS may be monitored for performance benchmarking, statistics, and metrics. At block 1240, the apparatus may determine if there is a failure with the vCMTS. If there is a failure, then at block 1250, the apparatus may stop the vCMTS. Otherwise, the apparatus may continue to block 1230 and monitor the vCMTS. Once the vCMTS has been stopped, at block 1260, the management module may restore the initial state. The initial state may be the state of the vCMTS before the upgrade of software.

Figure 13:
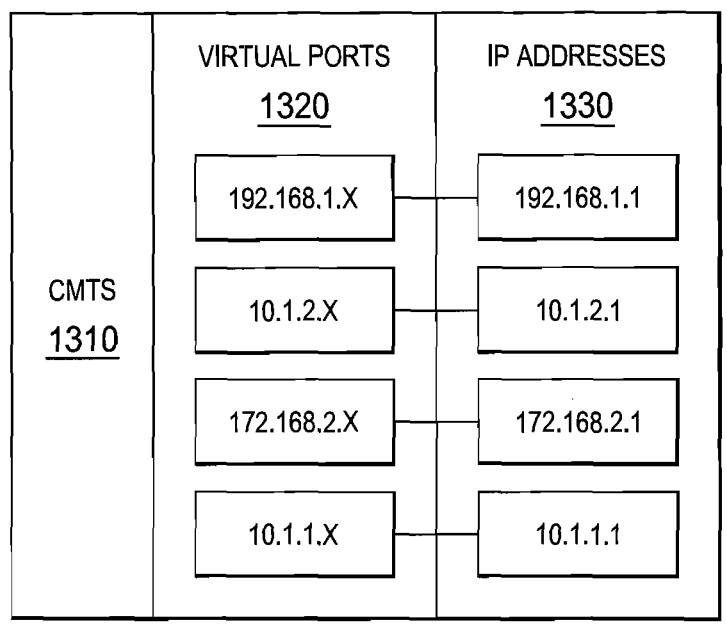
FIG. 13 shows a block diagram of a port assignment in accordance with at least one example embodiment.

FIG. 13 shows a block diagram of a port assignment in accordance with at least one example embodiment. As shown in FIG. 13, port assignment environment 1300 may include vCMTS 1310, virtual ports 1320, and Internet Protocol (IP) addresses 1330. The embodiments of this disclosure recognize and take into account that in a traditional CMTS, physical ports may be combined into "cable bundles." However, with the embodiments herein, each subscriber can manipulate its layer 3 individually without the need to be part of a formal L3 interface. By flattening the address space, the embodiments herein greatly simplify vCMTS configuration and address assignments and, further, help with mobility and note splitting cases.

Note that CMTS 12, vCMTS, and ACS 8 are network elements that can facilitate the network communication activities discussed herein. As used herein in this Specification, the term 'network element' is meant to encompass routers, switches, cable boxes, gateways, bridges, loadbalancers, cable CMTS routers, DSLAMs, cellular access concentrators, WiMAX access concentrators, firewalls, cable modems, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms, communication protocols, and interfaces that allow for the effective exchange of data or information.

In one implementation, CMTS 12, vCMTS, and/or ACS 8 include software to achieve (or to foster) the network communication activities discussed herein. This could include, for example, the implementation of instances of DOCSIS control 24, management module 51, routing module 20, etc., where these elements interact, perform reciprocating functions, and/or suitably coordinate their activities with peers. Additionally, each of these elements can have an internal structure (e.g., a processor, a memory element, etc.) to facilitate some of the operations described herein. In other embodiments, these network communication activities may be executed externally to these elements, or included in some other network element to achieve the intended functionality. Alternatively, CMTS 12, vCMTS, and/or ACS 8 may include software (or reciprocating software) that can coordinate with other network elements in order to achieve the network communication activities described herein. In still other embodiments, one or several devices may include any suitable algorithms, hardware, software, components, modules, interfaces, or objects that facilitate the operations discussed herein with respect to resequencing activities.

Cable Modem 9 may be representative of any type of client or user wishing to participate in a meeting session in communication system 10 (e.g., or in any other online platform). Furthermore, cable modem 9 may be associated with individuals, clients, customers, or end users wishing to participate in a meeting session in communication system 10 via some network. The term 'endpoint' is inclusive of devices used to initiate a communication, such as a computer, a personal digital assistant (PDA), a laptop or electronic notebook, a cellular telephone of any kind, an iPhone™, an IP phone, a Blackberry, a Google Droid™, an iPad™, a tablet, an Ultrabook™, a Microsoft Surface™, or any other device, component, element, or object capable of initiating voice, audio, video, media, or data exchanges within communication system 10. Cable Modem 9 may also be inclusive of a suitable interface to the human user, such as a microphone, a display, or a keyboard or other terminal equipment. Cable Modem 9 may also be any device that seeks to initiate a communication on behalf of another entity or element, such as a program, a proprietary conferencing device, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

It is imperative to note that FIGS. 1-5 are indicative of just some, of the multitude, of example implementations of communication system 10. Any of the modules or elements within communication system 10, CMTS 12, vCMTS, ACS 8, cable modem 9, etc. may readily be replaced, substituted, or eliminated based on particular needs. Furthermore, although described with reference to particular scenarios, where a given module (e.g., management module 51) is provided, any one or more of these elements may be provided externally, or consolidated and/or combined in any suitable fashion. In certain instances, certain elements may be provided in a single proprietary module, device, unit, etc. in order to achieve the teachings of the present disclosure.

It should also be noted that CMTS 12, vCMTS, ACS 8, and/or cable modem 9 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location are responsible for certain activities associated with the teachings of the present disclosure. In a general sense, the arrangement depicted in FIGS. 1-5 may be more logical in representations, whereas a physical architecture may include various permutations/combinations/hybrids of these elements.

Note that in certain example embodiments, the operations outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element may store data used for the operations described herein. This includes the memory element being able to store software, logic, code, or processor instructions that may be executed to carry out the activities described in this Specification. A processor may execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and may accommodate more complicated/sophisticated arrangements and configurations. Accordingly, the examples provided herein should not limit the scope or inhibit the broad teachings of communication system 10 as potentially applied to a myriad of other architectures. Additionally, although described with reference to particular scenarios where vCMTS 6 and ACS 8 reside in a particular physical location, vCMTS 6 and ACS 8 may reside in any location, provided it has some connectivity to a suitable network.

It is also important to note that the steps discussed with reference to FIGS. 1-13 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in CMTS environments or arrangements, the present disclosure may be used in any online environment that could benefit from such technology. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   identifying a subscriber group for a virtual cable modem termination system (vCMTS);
   retrieving a generic configuration file;
   creating a specific configuration file for the subscriber group using the generic configuration file; and
   configuring the vCMTS for the subscriber group using the specific configuration file.

2. The method of claim 1, wherein creating the specific configuration file comprises:
   retrieving information about the subscriber group from a pre-provisioned file; and
   adjusting the generic configuration file according to the pre-provisioned file to create the specific configuration file.

3. The method of claim 1, further comprising:
   periodically storing a state of the vCMTS;
   determining if there is a failure of the vCMTS; and
   restoring the stored state.

4. The method of claim 1, further comprising:
   reconciling a state of a subscriber in the subscriber group of the vCMTS.

5. The method of claim 1, further comprising:
   adjusting the specific configuration file of the vCMTS;
   monitoring the vCMTS;
   identifying an event with the vCMTS; and
   taking an action based on the event.

6. The method of claim 5, wherein the event is a failure of the vCMTS, and wherein the action includes stopping at least one function of the vCMTS.

7. A cable modem termination system (CMTS), comprising:
   a processor;
   a memory; and
   a virtual machine configured to assign a plurality of virtual CMTSs (vCMTSs) to a plurality of subscriber groups, wherein each of the vCMTSs implements at least one process allocated to the CMTS.

8. The CMTS of claim 7, wherein the at least one process executes a plurality of services.

9. The CMTS of claim 7, wherein the virtual machine further comprises:
   a routing module configured to provide route processing and forwarding tables to a forwarding module.

10. The CMTS of claim 7, wherein the virtual machine further comprises:
    a forwarding module configured to forward data packets from the CMTS to a core network.

11. The CMTS of claim 7, wherein the virtual machine further comprises a MAC layer.

12. The CMTS of claim 7, wherein the virtual machine further comprises a DOCSIS control configured to send timing and frequency requirements to a line card.

13. The CMTS of claim 7, further comprising a management module configured to direct data traffic to the plurality of vCMTSs.

14. The CMTS of claim 13, wherein the management module further comprises a mobility manager configured to perform load balancing for the plurality of vCMTSs.

15. An apparatus comprising at least one processor and at least one memory, the at least one memory including computer program instructions that, when executed by the at least one processor, cause the apparatus to perform a method, comprising:
    identifying a subscriber group for a virtual cable modem termination system (vCMTS);
    retrieving a generic configuration file;
    creating a specific configuration file for the subscriber group using the generic configuration file; and
    configuring the vCMTS for the subscriber group using the specific configuration file.

16. The apparatus of claim 15, wherein creating the specific configuration file further comprises:
    retrieving information about the subscriber group from a pre-provisioned file; and
    adjusting the generic configuration file according to the pre-provisioned file to create the specific configuration file.

17. The apparatus of claim 15, the method further comprising:
    periodically storing a state of the vCMTS;
    determining if there is a failure of the vCMTS; and
    restoring the stored state.

18. The apparatus of claim 15, the method further comprising:
    reconciling a state of a subscriber in the subscriber group of the vCMTS.

19. The apparatus of claim 15, further comprising:
adjusting the specific configuration file of the vCMTS;
monitoring the vCMTS;
identifying an event with the vCMTS; and
taking an action based on the event.

20. A non-transitory computer readable media comprising instructions that, when executed by a processor, cause an apparatus to:
retrieve a generic subscriber group configuration file;
create a specific configuration file for a specific subscriber group using the generic subscriber group configuration file;
assign the specific subscriber group to a virtual cable modem termination system (vCMTS); and
configure the vCMTS for the specific subscriber group using the specific configuration file.

* * * * *